Nov. 24, 1970                    V. J. KOVARIK                        3,543,147
             PHASE ANGLE MEASUREMENT SYSTEM FOR DETERMINING AND CONTROLLING
                THE RESONANCE OF THE RADIO FREQUENCY ACCELERATING CAVITIES
                    FOR HIGH ENERGY CHARGED PARTICLE ACCELERATORS
Filed March 29, 1968                                            5 Sheets-Sheet 1

*INVENTOR.*
VINCENT J. KOVARIK
BY

INVENTOR.
VINCENT J. KOVARIK

INVENTOR.
VINCENT J. KOVARIK
BY

United States Patent Office
3,543,147
Patented Nov. 24, 1970

1

3,543,147
PHASE ANGLE MEASUREMENT SYSTEM FOR DETERMINING AND CONTROLLING THE RESONANCE OF THE RADIO FREQUENCY ACCELERATING CAVITIES FOR HIGH ENERGY CHARGED PARTICLE ACCELERATORS
Vincent J. Kovarik, Bohemia, N.Y., assignor to the United States of America as represented by the United States Atomic Energy Commission
Filed Mar. 29, 1968, Ser. No. 717,262
Int. Cl. G01n 27/00
U.S. Cl. 324—57
3 Claims

ABSTRACT OF THE DISCLOSURE

Discriminating means responsive to the forward and reflected waves in a co-axial cable for determining whether the radio-frequency accelerating cavities for high energy accelerators are in or out of resonance. By measuring the phase angle difference between the forward and reflected waves the discriminator can be centrally located away from the accelerating cavities. The system also measures the reactive component of the accelerating cavities for the proper tuning thereof.

BACKGROUND OF THE INVENTION

In the field of high energy physics, a need exists for accurately resonating the radio-frequency accelerating cavities for high energy accelerators over a wide band of frequencies. These frequencies for example, vary from a minimum frequency of 1.4 megacycles per second to a maximum frequency of 4.5 megacycles per second over a period of a fraction of a second, e.g. one half second. Various proposals have been made and used to resonate these cavities at these frequencies, such as described and shown in "The Radio Frequency Accelerating System For the Brookhaven Alternating Gradient Synchrotron" by M. Plotkin, which was published in the 1960 International Convention Record, part 9. While these arrangements are useful and can resonate the cavities over the broad band of frequencies required, they have required a discriminator adjacent to and coupled to the input and output of the power amplifiers for the cavities for determining whether the cavity was in or out of resonance. Also, radiation has caused expensive problems of maintenance repair, and replacement of the discriminator, or has limited the discriminator to low energy accelerators having substantially low radiation levels. It is also advantageous centrally to locate the discriminator in the main radio-frequency complex.

It is an object of this invention, therefore, to provide an economic and practical discriminator apparatus and method for determining whether radio-frequency accelerating cavities for high energy accelerators are in or out of resonance by deriving the required discrimination from the radio-frequency transmission line for the cavities;

It is another object to remove the discriminator from areas of radiation, such as are present around the radio-frequency accelerating cavities for high energy accelerators;

It is another object centrally to locate the discriminator in the main radio-frequency complex for high energy accelerators;

A further object is to provide new and novel means for determining the reactive component of a radio-frequency load.

BRIEF SUMMARY OF THE INVENTION

The invention described herein was made in the course of, or under a contract with the U.S. Atomic Energy Commission.

2

The foregoing objects are achieved by utilizing the forward and reflected waves in the cavity transmission line. To this end, the phase angle difference between the forward and reflected waves in the transmission line is detected, since it corresponds to the reactive component of the load. Moreover, in one embodiment, this phase angle difference is detected for continuously tuning the cavities over a wide band of frequencies. With the proper selection of components and method steps, as described in more detail hereinafter, the desired discrimination tuning and driving of the radio-frequency accelerator cavities are provided.

The above and further objects and novel features of the invention will appear more fully from the following detailed description when the same is read in connection with the accompanying drawings. It is expressly understood, however, that the drawings are not intended as a definition of the invention but are for the purpose of illustration only.

BRIEF DESCRIPTION OF THE SEVERAL VIEWS OF THE DRAWINGS

In the drawings where like elements are referenced alike.

BRIEF DESCRIPTION OF THE PREFERRED EMBODIMENT

Figure 2:
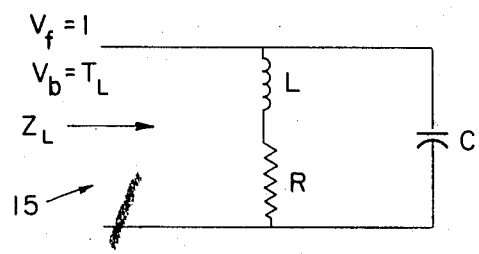
FIG. 2 is a partial schematic diagram of the transformed inductance, capacitance and resistance of the cavities of FIG. 1.
Figure 9:
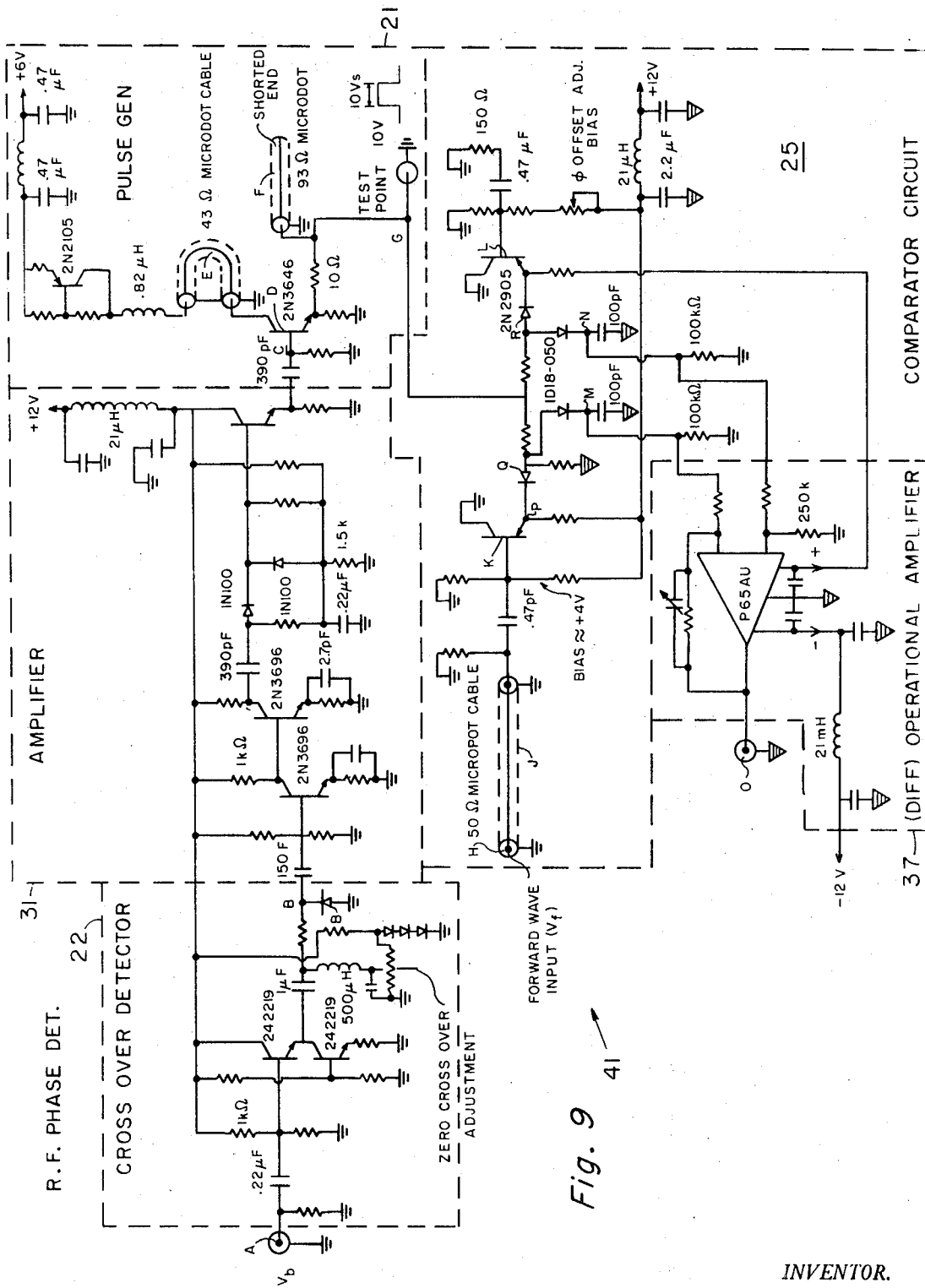
FIG. 9 is a practical device for FIG. 5.

It is known that high intensity beams of high energy particles can be accelerated by radio-frequency accelerating cavities wherein the cavities are driven by a main, wide band, radio-frequency driver source through a co-axial cable and a power amplifier whose input is adjusted to tune the cavities by DC saturation. FIGS. 2 and 9 of the above-cited Plotkin reference illustrates one DC saturation control system wherein the RF fluxes in two cavity halves are in phase while the DC fluxes are out of phase. Therefore, the total RF induced in the DC is zero if everything is balanced and the RF and DC circuits are thus decoupled. Since the saturating winding is the same as the RF winding, it is a one turn structure and requires currents up to 1000 amperes, controllable to keep the load resonant. The invention hereinafter described, is useful in a tuning loop of the type shown in FIG. 2 of the above-cited reference wherein a new cable coupled discriminator is provided for detecting whether the accelerating cavities are in or out of resonance. Provision is also made for adjusting the DC saturation control so as to tune the cavities. It will be understood in more detail hereinafter, however, that the system of this invention is coupled to the co-axial cable for driving the RF cavities for determining the reactive component of the cavities, and as such it is useful in any system employing an RF source for driving a reactive load through a co-axial cable for determining the reactive component of the load.

Figure 1:
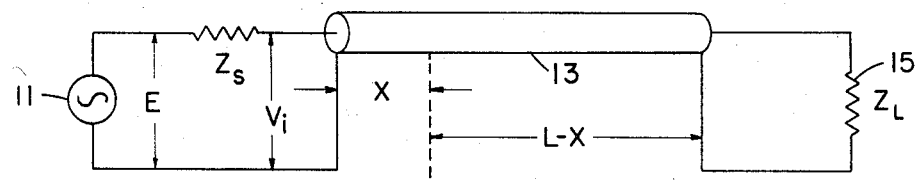
FIG. 1 is a partial schematic diagram of a power source and transmission line for RF accelerating cavities in a high energy accelerator.

In understanding how this invention detects the reactive component of the RF accelerating cavities for a high energy accelerator and/or detects whether they are in or out of resonance, reference is made to FIG. 1, which illustrates an RF source 11, a co-axial cable 13 and a load 15 driven by the source 11 through the cable 13. For any point $x$ on the co-axial line 13 the incident forward wave from the source 11 is given by:

$$V_F = \frac{V_i e^{-\gamma x}}{1 - \Gamma_s \Gamma_L e^{-2\gamma L}}$$

where $V_F$ is the forward wave voltage, $V_i$ is the generator output voltage minus the loss across the internal impedance of the generator, $\Gamma_s$ is the ratio of the source impedance minus the cable impedance $Z_0$ divided by the source impedance $Z_s$ plus the cable impedance, $\Gamma_L$ is the load impedance $Z_L$ minus the cable impedance divided by the load impedance plus the cable impedance, while the reflected wave is given by:

$$V_B = \frac{V_i \Gamma_L e^{-\gamma(2L-x)}}{1 - \Gamma_s \Gamma_L e^{-2\gamma L}}$$

where $x$ is the distance from the source 11 to the measuring point, L is the length of line 13, $\gamma$ is the propagation constant of the line 13, $Z_L$ is the impedance of load 15, $Z_s$ is the impedance of source 11, and $Z_0$ is the impedance of the line 13.

If the forward wave from source 11 is delayed by $e^{-2\gamma(L-x)}$, it becomes:

$$V_F = \frac{V_i e^{-\gamma(2L-x)}}{1 - \Gamma_s \Gamma_L e^{-2\gamma L}}$$

Since a comparison of the forward and reflected waves will yield the necessary information, all of the common factors can be divided out to give: $V_f = 1$ and $V_b = \Gamma_L$.

Further, if the inductance L, capacitance C and resistance R are the transformed inductance, capacitance and resistance in an assumed load 15, as shown in FIG. 2, then:

$$\Gamma_L = |\Gamma_L| \angle \varphi$$

where $$|\Gamma_L| = \frac{(1-\omega_n^2)\{[Q^2(\omega_n^2-1)+2\omega_n^2]^2 + 4Q^2\}^{1/2}}{(1-\omega_n^2)^2 Q^2 + 4\omega_n^4}$$

$$\varphi = \tan^{-1} \frac{2Q(Q^2+1)}{Q^4(\omega_n^2-1)^2 + \omega_n^2(2Q^2+1)+1}$$

$$\omega_n = \frac{\omega}{\omega_0}, \quad 100\left(1 - \frac{\omega}{\omega_0}\right) = \text{percent phase error}$$

Figure 3:
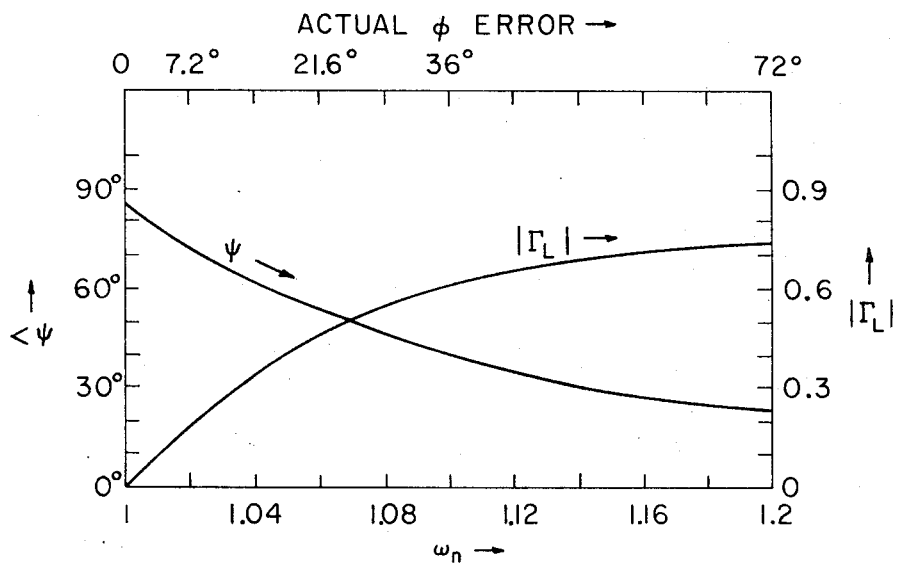
FIG. 3 is a graphic representation of the amplitude $\Gamma_L = V_b$ and the calculated phase wave $\psi$ in degrees of the backward wave in the transmission line of FIG. 1 plotted against actual phase error $\varphi$ in degrees and percent phase error $\omega_n$ on the horizontal axes and $\psi$ and $\Gamma_L$ on the vertical axes.
Figure 4:
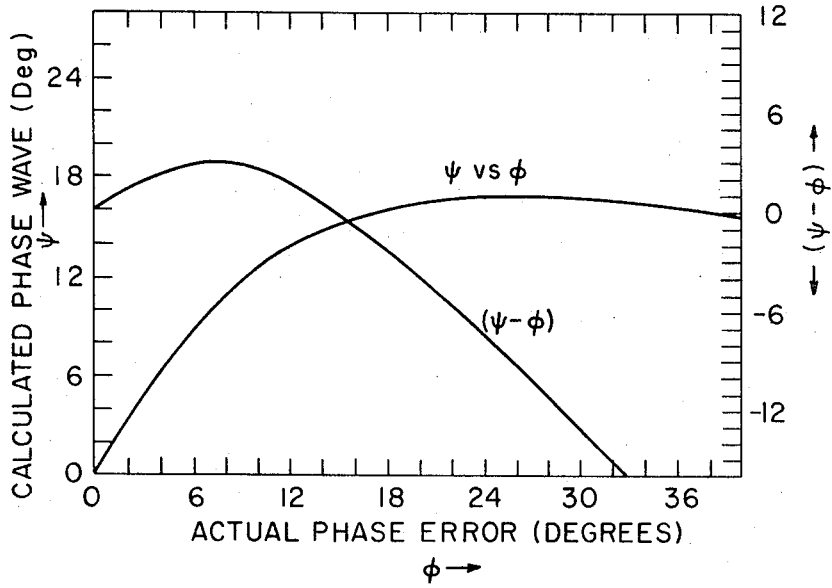
FIG. 4 plots $\psi$ vs. $\varphi$ and $\psi-\varphi$ of FIG. 3 vs. $\varphi$ (horizontal axis) and $\psi$ and $(\psi-\varphi)$ (vertical axis)

$\omega$ = driving frequency
$\omega_0^2 = 1/LC$ natural frequency of load ($Q > 1$)
$Q = \omega L/R$ Assuming a Q of 10, plots of $\varphi$ and $|\Gamma_L|$ are shown in FIG. 3. It will be seen from this figure that $\varphi$ does not represent the phase error due to an untuned load. For example, as $\omega_n$ approaches one (0°), $\varphi$ goes to 90° while $|\Gamma_L|$ goes to zero. Thus the information cannot be used directly without a translating device. However, if only a small range of phase errors (e.g. ±15°) are to be measured, then by the addition of some of the incident wave to the reflected wave by a suitable connection as will be understood in more detail hereinafter, reasonable agreement between the adjusted $\varphi$ and $\omega_n$ can be achieved. In this regard, the results of a sample calculation, which are plotted in FIG. 4, indicates a maximum deviation of ±3.5° in the range of ±20° of phase error.

It will be understood in connection with the above that the source 11 produces a forward wave in cable 13 and load 15 produces a reflected wave in cable 13. Moreover, the magnitude of the reactive component of the load 15 determines the phase angle between these waves. Thus first and second signals proportional to the phase angles of the forward and reflected waves can be compared to a reference or third signal in a comparator to provide a fourth signal corresponding to the reactive component of the load 15.

In accordance with this invention, the above-described first and second signals are derived in a discriminator in the form of voltages $V_f$ and $V_b$ proportional to the amplitude of the forward and reflected signals and the sum of these signals is compared to a constant in a comparator to produce the fourth signal. Moreover, since this cable connects with the main driver source in the central RF complex for the source, the discriminator of this invention can be placed in this same RF complex, which is out of the area of high radiation levels produced adjacent the accelerating cavities in the above-referenced accelerator. Likewise the discriminator can operably adjust the control current for the above-mentioned DC saturation adjustment in the tuning loop therefor, continuously and accurately to maintain resonance in the accelerating cavities, represented by load 15. To this end, the functional adjustment of the discriminator of this invention is analogous to the function of turning an adjustment "knob" where the DC saturation control is represented as the tuning "knob" for the accelerator cavities, represented herein by load 15.

Figure 5:
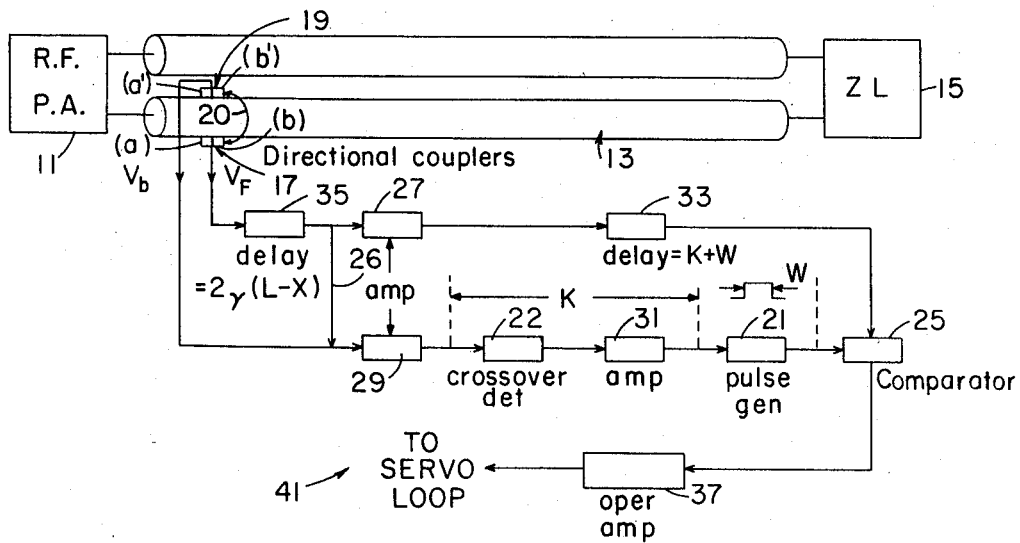
FIG. 5 is a practical embodiment of the system of this invention.

In one embodiment for deriving the above described signals, which is illustrated in FIG. 5, two commercially available directional couplers 17 and 19 astride the cable 13 produce the signals $V_f$ and $V_b$. The coupler 17 has two distinct elements $a$ and $b$ and the coupler 19 has two distinct elements $a'$ and $b'$. Each of the elements $a$ and $a'$ couples capacitively to the inner conductor in co-axial cable 13 producing an output proportional to the current wave. Should the inductive coupling element $b$ be phased so that the voltages in elements $a$ and $b$ add and should the other inductive coupling element $b'$ be arranged and connected by a suitable reversing link 20 to be 180° out of phase with its counter-part inductive coupling element $b$, the voltages in elements $a'$ and $b'$ will subtract.

Since the current wave is related to the voltage wave by $Z_0$ of the line, the output of the couplers can be written as:

$$V_f = K_1 V_c + K_2 V_L = \text{incident wave}$$
$$V_b = K_1 V_c - K_2 V_L = \text{reflected wave}$$

where $V_c$ = capacitive pickup, $V_L$ = inductive pickup, and $K_1$, $K_2$ are constants.

Thus the first coupler 17 produces a signal $V_f$ proportional to the amplitude of the forward wave and corresponds to the phase angle of this wave, and the second coupler 19 produces a signal $V_b$ proportional to the amplitude of the reflected wave and corresponds to the phase angle of this wave.

Figure 6:
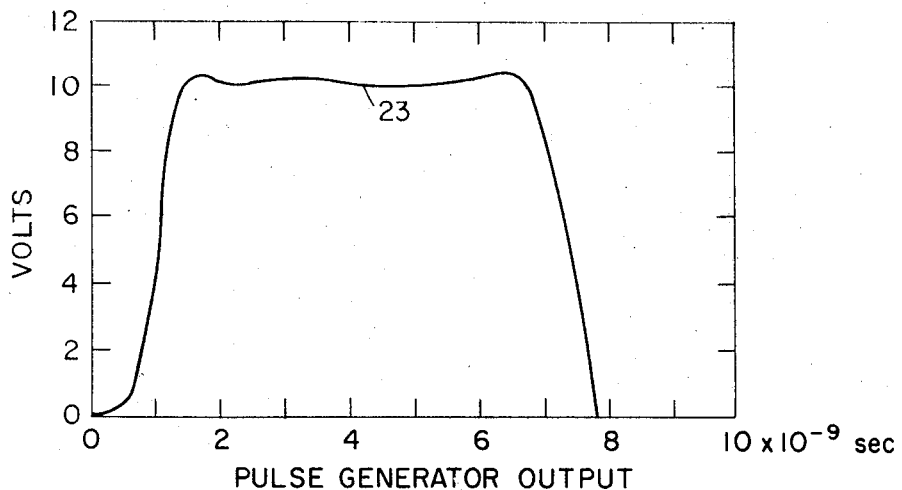
FIG. 6 plots output V vs. time of device of FIG. 5.

In this embodiment, the reflected wave signal $V_b$ triggers a pulse generator 21 each time the wave goes through zero crossover with a positive derivative as determined by cross-over detector 22. A typical output from generator 21 is shown in FIG. 6. The height of this pulse 23 is clamped in the comparator circuit 25 to the value of the forward wave signal $V_f$ plus a constant. By an addition through connection 26 corresponding to an addition of some of the incident wave to the reflected wave, and with the signals $V_f$ and $V_b$ amplified by amplifier 27, 29 and 31, and equally delayed by delays 33 and 35, as illustrated in FIG. 5, the output of the comparator 25 then becomes equal to the sine of the phase difference between $V_f$ and $V_b$. The constant is thereupon subtracted out in the operational amplifier 37 to give the desired fourth signal described above.

Figure 8:
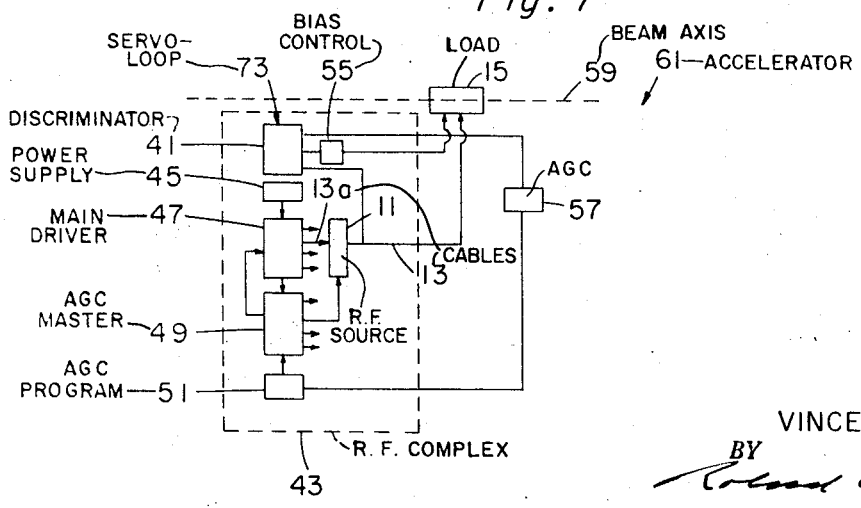
FIG. 8 schematically shows an accelerator with the system of FIG. 5.

As shown in FIG. 8, the overall discriminator 41 for producing the above described fourth signal, is located in the main RF complex 43 containing the central power supply 45, main driver 47, AGC master 49 and AGC program 51. The driver 47 drives through cable 13a the power amplifiers for each cavity 15, while the discriminator 41 senses the phase of the forward and reflected waves in cable 13, which connects the power amplifiers 11 to the RF accelerating cavities 15, thereby to produce the signals $V_f$ and $V_b$. These signals are compared in comparator 25 and fed to operational amplifier 37 to produce the fourth or control signal for controlling the DC saturation bias control 55 to maintain the cavities 15 in resonance.

It is understood from the above that the difference between $V_f$ and $V_b$ and a reference voltage in discriminator 41 can also be used for an AGC 57, such as shown in FIG. 2 of the above-cited reference. As is understood in the art, this AGC 57 controls the master, which is in turn programmed by a AGC programmer 51. This overall system thereby provides the required frequency band in cavities 15 and maintains the cavities 15 in resonance to accelerate a high energy beam of charged particles along equilbrium axis 59 in a high energy accelerator 61, partially shown schematically in FIG. 8 for ease of explanation.

Figure 7:
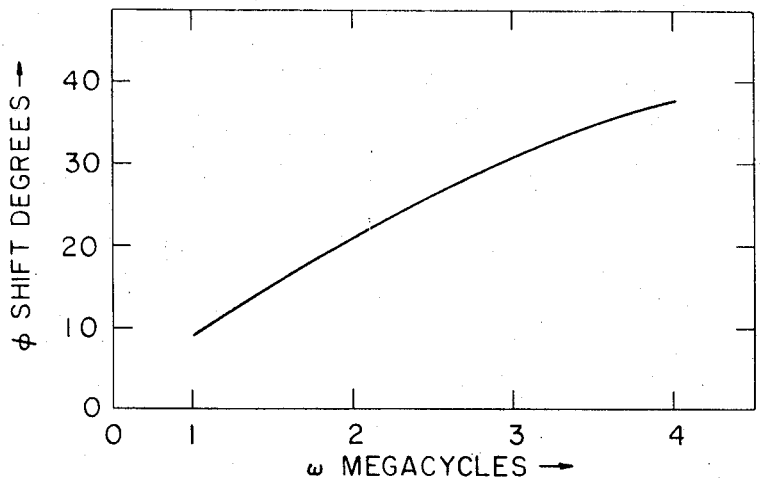
FIG. 7 plots a delayed output of the device of FIG. 5 with $\psi$ (vertical axis) and mc. (horizontal axis)

The described system has been tested with a signal generator driving both the forward and backward wave inputs. By inserting a delay cable in one input and sweeping the frequency from one to four megacycles, the results illustrated in FIG. 7 were obtained. A measure of the bandwidth was also obtained by driving $V_f$ and $V_b$ inputs independently. To this end one input was held constant (=2 megacycles) while the other was charged until the output dropped to 3 db. The measured bandwidth was 100 kc., while performance was not affected by power supply variations of 10%, or temperature variations from 25° to 50° C. Moreover, measurements of the complete system including the directional couplers provided qualitative results indicating the success of this system in performing the desired functions.

In the practical embodiment, illustrated in FIG. 9, the cross-over detector 22, amplifier 31, pulse generator 21, comparator circuit 25 and operational amplifier 37, are shown as they are connected in RF phase detector 41 for receiving the reflected wave input from coupler 19 for indicating whether cavity 15 is in resonance and/or for providing the desired signal in servo-loop 73 for causing the cavity to resonate as desired.

The reflected wave ($V_b$) enters at point A. Its crossover is detected by the action of a tunnel diode (B). The pulse produced by the tunnel diode is amplified and sent to the pulse generator (C). Transistor D is operated in the avalanche mode and thus produces a pulse whose magnitude and length are not proportional to the driver pulse. When transistor D is triggered it sends a negative wave down cable E. This wave sees an open circuit at the end and is reflected back in phase with the original signal. This action turns transistor D off. The triggering of transistor D also produces a positive pulse which is sent down cable F. Since cable F is shorted it reflects this positive wave 180° out of phase. This produces a positive pulse at point G whose length is equal to twice the electrical length of cable F. The amplitude at point G is proportional to the applied voltage on the collector of transistor D. This pulse (10 nanoseconds long and 12 volts high) is sent to the comparator circuit 25.

The forward wave ($V_f$) enters at point H and is delayed by cable J. This delay insures that when there is no reactive load (zero crossover of $V_f$ and $V_b$ occur at the same time) the trailing edge of the pulse at point G coincides with the zero crossover of the forward wave. Transistor K is biased to approximately 4 volts. Transistor L is biased to the same voltage by the $\varphi$ offset adjustment. When there is no generated pulse at G then points M and N are at the same voltage. These voltages are sent to a difference operational amplifier which subtracts the two voltages resulting in a zero output at point 0.

In the normal operation of the comparator, point P has a voltage on it ($V_p$) which is given by:

$$V_p = K + K_2 \sin \omega t$$

K=4 volts (bias voltage)
$K_2$=4 volts (maximum amplitude of $V_f$)

Since $V_b$ produces pulses at a frequency equal to $V_f$ and for one time period (cycle):

$V_g = K_3$ (in the interval $2\pi - w$ to $2\pi$)
$V_g = 0$ (in the interval 0 to $2\pi$)

where $K_3$ is the amplitude and $w$ is the width of the pulse at time $2\pi$.

Figure 10:
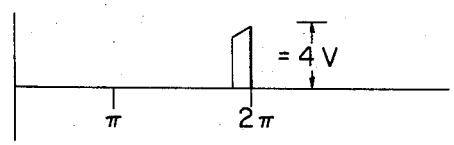
FIG. 10 plots in phase V at Q in FIG. 9.
Figures 11, 12:
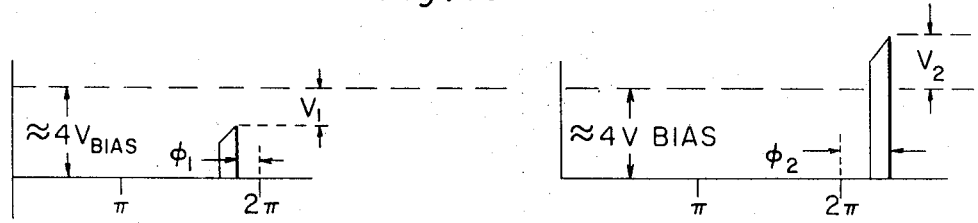
FIG. 11 plots leading out of phase V at Q of FIG. 9.
FIG. 12 plots lagging out of phase V at Q of FIG. 9.
Figure 13:
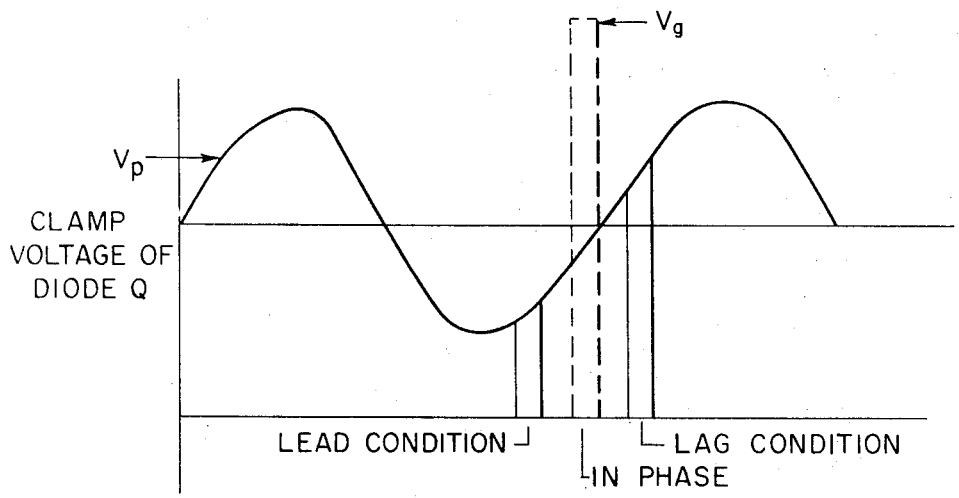
FIG. 13 plots $V_p$ clamp voltage of diode Q of FIG. 9.

$V_g$ is clamped by transistors K and L to their bias voltages. If no $V_f$ signal is present then $V_g$ is clamped to approximately 4 volts at points Q and R by the diodes connected to transistors K and L. However, point P can vary according to $V_p$. This means that the amplitude of the pulse voltage at Q will vary in the same manner. If the phase between $V_f$ and $V_b$ are the same, then the voltage at Q as is shown in FIG. 10. If $V_b$ is out of phase with $V_f$ then the voltage at Q is proportional to this phase difference as shown in FIGS. 11 and 12.

Where $V_1$ is a voltage equal to the sine of $\phi 1$ (the amount of lead) and $V_2$ is a voltage equal to the sine of $\phi 2$ (the amount of lag). The operational amplifier subtracts out the bias voltage and leaves $V_1$, $V_2$, or zero depending on whether a lead, lag, or in phase condition exists between $V_f$ and $V_b$ as shown in FIG. 13.

While this invention has been described as it is useful for measuring the reactive component of radio-frequency accelerating cavities for tuning them for the high energy acceleration of charged particles, it will be understood that the discriminator system of this invention is likewise useful for determining the reactive component of any reactive load that is driven through a co-axial cable by a high frequency source.

The system of this invention has the advantage of providing a discriminating system for determining the reactive component of a high frequency load by detecting the phase angle difference in the forward and reflected waves in the co-axial transmission line for driving the load from a source. Moreover, a specific system is provided for centrally determining the phase angle of the forward and reflected waves, and comparing these phase angles with a reference to produce a signal corresponding to the load impedance of an accelerating cavity for high energy accelerators for tuning the cavities to resonance over a wide band of frequencies.

What is claimed is:
1. In an accelerating system for high energy charged particle accelerators of the type having a radio-frequency power source, cable and accelerating cavity, said cable transmitting radio-frequency forward waves to said accelerating cavity whereby reflected waves are reactively produced in said cable by said cavity, said accelerating cavity having DC saturation means for tuning said cavity for resonating said cavity to receive and accelerate to high energies a high density beam of charged particles whose velocities increase by increasing the resonance frequency of said cavity, wherein the improvement comprises means for remotely determining whether said cavity is in resonance over a wide band of frequencies for varying said frequencies over said wide band of frequencies for resonating said cavity over said wide band of frequencies, comprising directional coupling means inductively and capactively coupled to said cable for responding to the phase angle difference between said forward and reflected waves in said cable, means producing a measuring signal remote from said cavity corresponding to the amount and direction said phase angle difference needs to be changed to resonate said cavity as said particles increase in velocity, and means responsive to said measuring signal for remotely adjusting said DC saturation means for said cavity in the correct direction an amount for changing said phase angle difference for reducing said measuring signal to zero for maintaining said cavity in resonance over said wide band of frequencies as said particles are accelerated.

2. The invention of claim 1 wherein said coupling means has voltage producing directional coupling elements capacitively coupled to said cable and voltage producing directional coupling elements inductively coupled to said cable for producing a forward wave voltage ($V_f$) proportional to the amplitude of said forward waves, and for producing a reflected wave voltage ($V_b$) proportional to the amplitude of said reflected waves, and wherein said measuring signal producing means has output means that generates a pulse whose output is clamped to the value of said forward wave voltage ($V_f$) plus a constant, and means responsive to the derivative of said reflected wave voltage ($V_b$) for triggering said output means to generate said pulse when said output means produces said measuring signal.

3. The invention of claim 1 wherein said coupling means has distinct directional coupling elements respectively capacitively and inductively coupled to said cable for producing respective forward and reflected wave voltages ($V_f$ and $V_b$), and wherein said measuring signal producing means has means for comparing said voltages ($V_f$ and $V_b$) to produce an output equal to the sine of the phase angle differences between said voltages ($V_f$ and $V_b$) for producing said measuring signal.

References Cited
UNITED STATES PATENTS

| | | | |
|---|---|---|---|
| 2,442,606 | 6/1948 | Korman | 324—58 X |
| 2,523,791 | 9/1950 | Vahle et al. | |
| 2,624,780 | 1/1953 | Byrne | 324—58 |

OTHER REFERENCES

Anderson et al.: Advanced Network Analyzer, in Hewlett-Packard Journal, February 1967, pp. 1–10.

Phase Gain Impedance Admittance Attenuation, in Hewlett-Packard Journal, May 17, 1967, pp. 1–8.

EDWARD E. KUBASIEWICZ, Primary Examiner